United States Patent [19]

Sommerfeld

[11] 4,345,353
[45] Aug. 24, 1982

[54] FILTERING DEVICE

[75] Inventor: George L. Sommerfeld, Minneapolis, Minn.

[73] Assignee: Tennant Company, Minneapolis, Minn.

[21] Appl. No.: 210,040

[22] Filed: Nov. 24, 1980

Related U.S. Application Data

[63] Continuation-in-part of Ser. No. 60,012, Jul. 23, 1979, Pat. No. 4,258,451.

[51] Int. Cl.³ .............................................. B01D 46/04
[52] U.S. Cl. ........................................ 15/349; 15/352; 55/300; 55/304
[58] Field of Search ................. 15/340, 347, 348, 349, 15/352; 55/290, 300, 304

[56] References Cited

U.S. PATENT DOCUMENTS

| 934,042 | 9/1909 | Christoph | 55/300 |
|---|---|---|---|
| 1,268,304 | 6/1918 | Warren | 55/300 |
| 1,864,782 | 6/1932 | White | |
| 1,868,876 | 7/1932 | Boesger | |
| 3,368,331 | 2/1965 | Baxendale | 55/299 |
| 3,407,572 | 10/1968 | Tolley | 55/283 |
| 3,587,213 | 6/1971 | Tamny et al. | 55/300 |
| 3,639,940 | 2/1972 | Carlson et al. | 15/352 |
| 3,792,569 | 2/1974 | Carlson et al. | 55/288 |
| 3,847,576 | 11/1974 | Oberdank | 55/283 |

Primary Examiner—Chris K. Moore
Attorney, Agent, or Firm—Norman P. Friederichs

[57] ABSTRACT

A sweeping machine is disclosed including a planar pleated filter and a striking mechanism for removing collected dust from the pleated filter. The striking mechanism includes an elongated strap with resilient pad which overlies the pleated filter. A rotatably driven eccentric weight drives the strap and pad to strike the upper surface of the pleated filter.

An industrial filter device is disclosed including a planar pleated filter and a striking mechanism for removing collected dust from the pleated filter. The striking mechanism includes an elongated strap which overlies the pleated filter. A rotatably driven eccentric weight drives the strap to strike the upper surface of the pleated filter.

11 Claims, 9 Drawing Figures

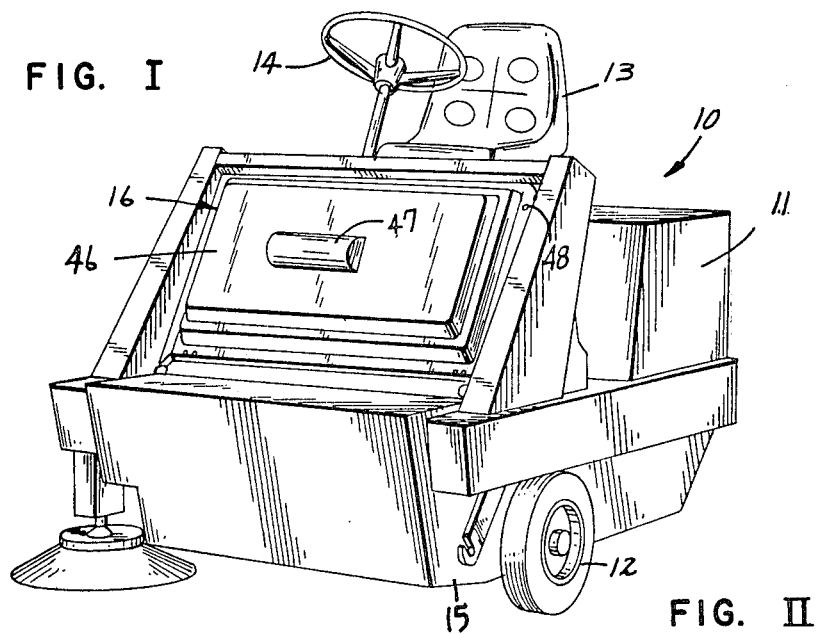
FIG. I
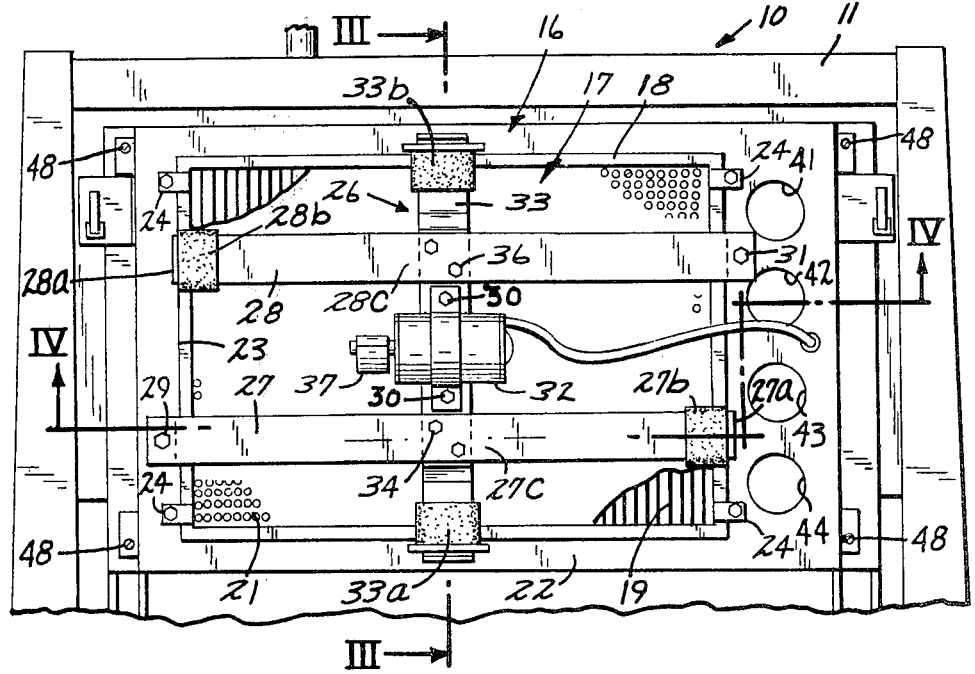
FIG. II

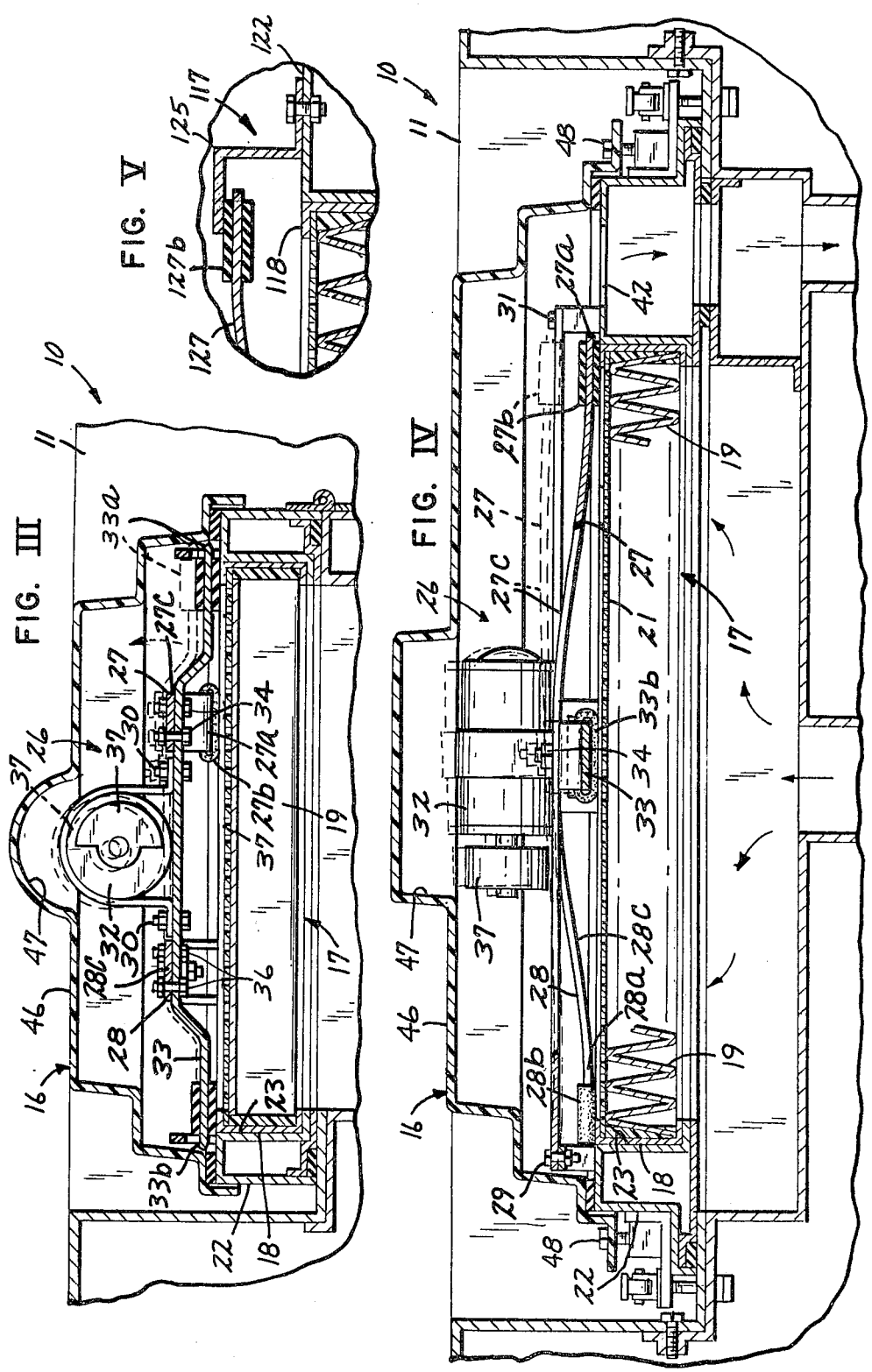

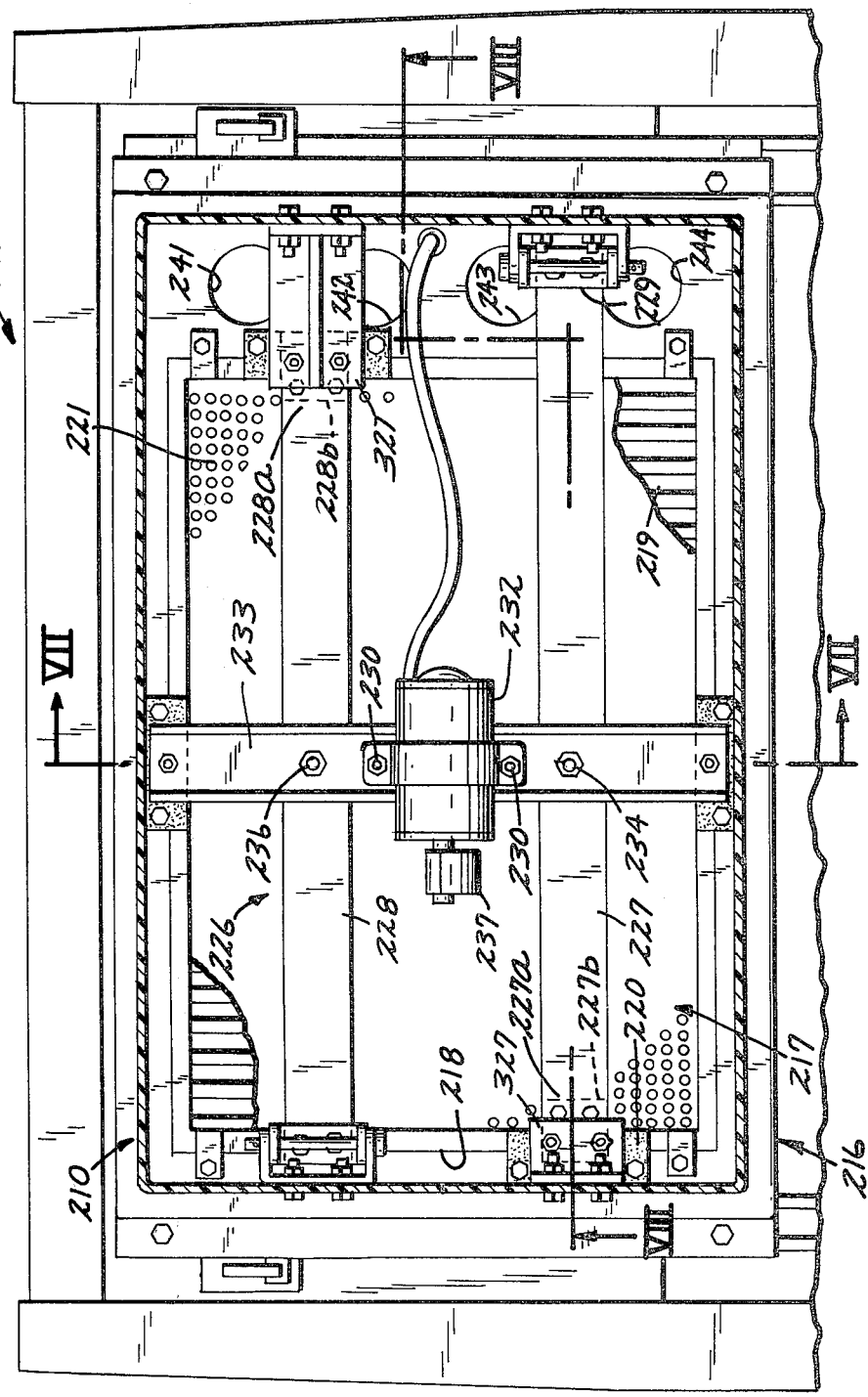
FIG. VI

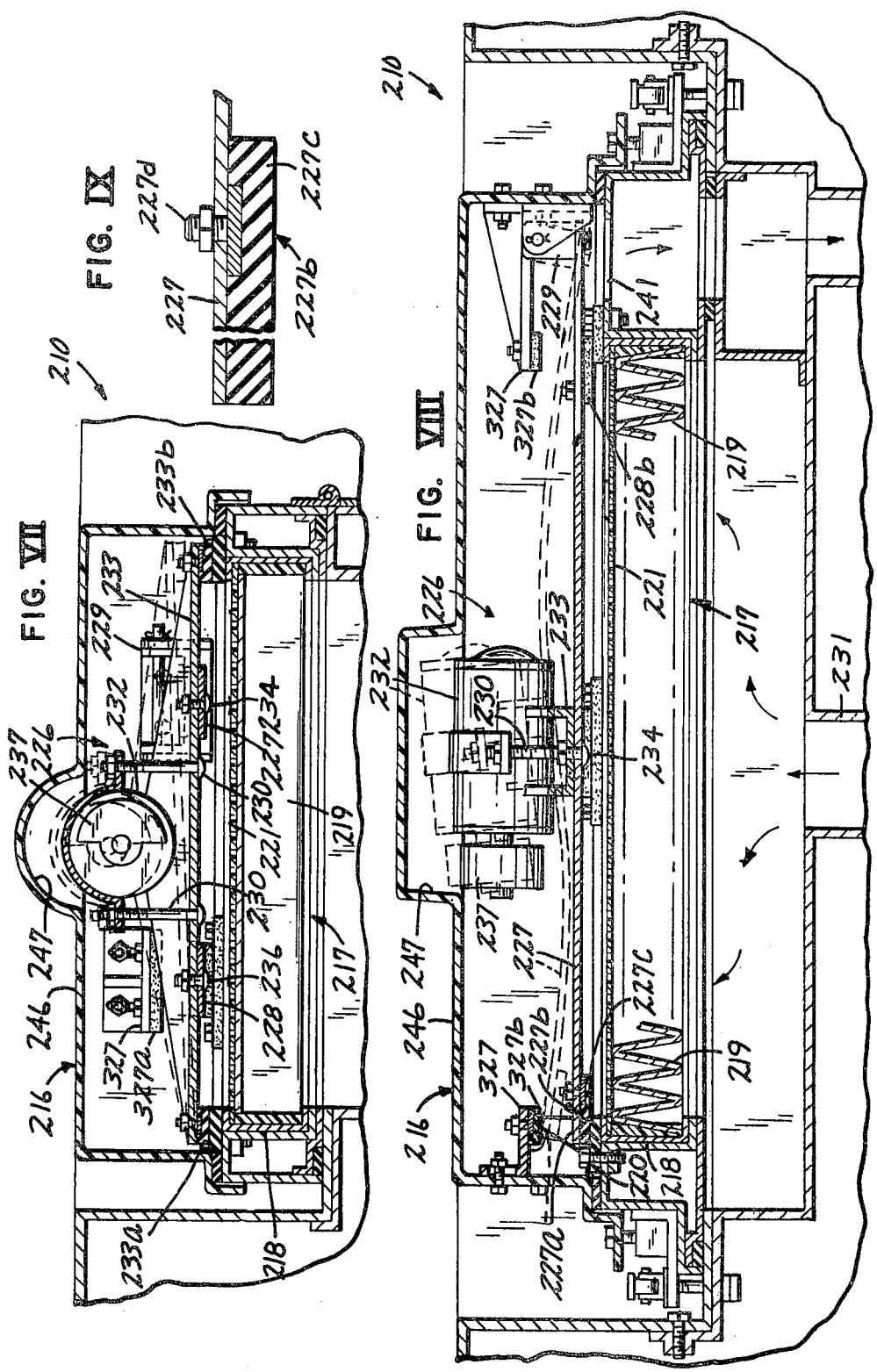

FILTERING DEVICE

This is a continuation-in-part of U.S. Pat. Application Ser. No. 60,012, entitled SURFACE SWEEPING MACHINE, filed July 23, 1979, now U.S. Pat. No. 4,258,451, issued Mar. 31, 1981.

TECHNICAL FIELD

The present invention relates to filtering devices and also to surface maintenance equipment utilizing filtering devices. More particularly, the present invention relates to surface maintenance equipment utilizing vacuum pumps for drawing a vacuum stream through such equipment. The present invention relates to such equipment including a filter for removing dust from the air stream prior to passage through the vacuum pump.

BACKGROUND OF THE PRIOR ART

Filtering devices are used in a wide variety of environments including, for example, industrial buildings and surface maintenance equipment. A wide variety of machines is available for use in maintenance of surfaces such as floors, parking lots and streets. These maintenance machines generally include sweeping machines and scrubbing machines. The sweeping machines utilize fans or pumps to draw a vacuum in the brush housing thereby minimizing dusting problems around the sweeping area. A problem which has been long existent in the prior art, is the accumulation of dust on the filter. As the dust accumulates, it tends to block the filter and create a substantial pressure differential between the upstream side of the filter and the downstream side of the filter. Such blockage reduces the dust controlling efficiency of the equipment. Many attempts have been made in the past to overcome such blockage problem generally by vibration or shaking of the filter. Such arrangements have improved the efficiency by removing the dust accumulations to a certain extent. The shaking of the filter, however, has not been as effective in removing the dust as would be desirable.

SUMMARY OF THE PRESENT INVENTION

In one embodiment the present invention is a filter structure which may be used in any environment desired, to remove dust or fine debris from an airstream. This may be in an industrial plant to clean up the air or on woodworking equipment such as large sanding or abrading equipment.

The present invention in another embodiment provides a sweeper which may include a cylindrically shaped rotatable brush, a brush housing, a hopper and a vacuum pump. The brush housing surrounds a portion of the brush. The hopper communicates with the brush housing. The vacuum pump draws a partial vacuum stream through the brush housing and generally also through the hopper. A filter is located between the hopper and the vacuum pump.

The present filter is planar in general overall configuration and includes a pleated filter medium. A striker is provided which repeatedly engages the upper edge of the filter frame or medium to create a shock wave across the filter medium thereby removing accumulated dust.

IN THE DRAWINGS

FIG. I shows a perspective view of a sweeper using the present invention;

FIG. II shows a top plan view of a filter structure of the present invention;

FIG. III shows a cross sectional view of the filter structure taken along the lines III—III in FIG. II;

FIG. IV shows a cross sectional view taken along the lines IV—IV in FIG. II;

FIG. V shows a modification of a portion of the filter structure of FIG. IV;

FIG. VI shows another embodiment of the present filter structure;

FIG. VII shows a cross-sectional view of the filter of FIG. VI taken along the lines VII—VII in FIG. VI;

FIG. VIII is a cross-sectional view taken along the lines VIII—VIII in FIG. VI; and FIG. IX is a cross-sectional view of a portion of the filter of FIG. VI.

FLOOR SWEEPING DEVICE

The present invention as illustrated in FIGS. I-IV relates to surface maintenance equipment commonly called sweepers. The sweeper 10 of the present invention may be generally of conventional design including a body portion 11 supported on a plurality of wheels such as 12. The body 11 may have a seat 13 on which an operator may ride and a steering mechanism 14 for control of the direction traversed by the equipment. The body 11 has a sweeper housing 15 from which dirt and debris is picked up. The sweeper 10 has a housing 16 which contains a filtering element 17 as illustrated in FIG. II. In this instance, the filter element 17 may be disposed in an inclined position, however, having a substantial horizontal component.

Various conventional aspects of the sweeper 10 are not specifically illustrated. For example, a vacuum pump is disposed within the body 11 for drawing a partial vacuum stream through the system. Also, if desired, a cylindrical brush may be disposed within the sweeper housing 15 and in contact with the surface to be swept. The filter structure 17 may include a metal frame 18 which extends around the entire periphery of the panel filter. The frame 18 may be of light gauged metal such as aluminum. The filter 17 further includes a pleated panel filter medium 19 which is mounted in the frame 18. If desired, a perforated sheet metal member 21 may be disposed over the pleated panel 19.

The filter 17 may be suitably mounted in a portion 22 of frame 11. In other words, a well 23 may be defined in the frame 22 for reception of filter 17. Further, suitable structure such as the screw and tabs 24 may be provided to secure the filter in place.

A striker member 26 may be superimposed over the filter 17. The striker 26 includes at least one and preferably two straps such as 27, 28 which are in contact with the upper portion of the filter 17. The straps 27, 28 may be of any suitable material such as spring steel. The striker strap 27 may be secured at one end by screw 29 to the body member 22. The other end of strap 27 is free. The strap 28 is secured to the opposite side of body portion 22 such as by screw 31. The other end of strap 28 is free. The straps 27 and 28 may be in contact with the filter frame 18 at their respective free ends 27a and 28a. The straps 27 and 28 each have a resilient sleeve 27b and 28b secured at the respective free end 27a and 28a. The resilient sleeves 27b and 28b may be of a rubber composition and are secured to the respective strap by adhesive. The sleeves 27b and 28b act as hammers to vibrate the filter 17.

The striker 26 has an oscillator which acts on straps 27 and 28 to cause such straps to strike the filter 17, producing a shock. The oscillator may be an electric solenoid. Alternatively, the oscillator may be an electrically operated motor 32 which is mounted on a cross member 33 by bolts 30. Cross member 33 may be secured to an intermediate portion of straps 27, 28 such as by bolts 34 and 36. The cross member 33 has a resilient sleeve 33a and 33b, respectively, at each end for striking the filter frame 18. The electric motor 32 carries an eccentric weight 37.

The lower side of the filter 17 may communicate with the hopper of the sweeper 10. Alternatively, the lower side of filter 17 may communicate with the brush housing. The upper side of filter 17 communicates with a plurality of ducts 41, 42, 43 and 44 which lead to the vacuum pump. A cover 46 may be disposed over the filter 17 and striker 26 in an air tight engagement thereby requiring any air passing therebetween to pass through filter 17 as hereinafter described. A cavity 47 may be provided in cover 46 in which the electric motor 32 may be disposed. The cover 46 may be suitably held in place by screws 48. The spacing between cover 46 and the filter 17 is sufficient to permit appropriate movement of the motor 32 with the eccentric weight 37 as well as movement of the striker straps 27 and 28 as illustrated by broken lines in FIGS. III and IV.

FIG. V illustrates a modification of the filter structure of FIG. IV. The filter structure 117 of FIG. V may be identical to that of FIG. IV with the exception that the ends of the striker straps, such as 127, are partially restrained in their upward movement. The end of strap 127 may be restrained by the rubber sleeve 127b striking stop 125 which is bolted to body member 122. In its downward movement rubber sleeve 127 strikes filter frame 118. The degree of restraint may be varied as desired. Of course, various other modifications may be made without departing from the broader scope of the present invention.

Operation of the Invention

Although operation of the invention would be apparent from the preceding description of the invention, it will be further detailed hereinafter in order to assure a more complete understanding of the present invention. During normal operation, an operator sits on the seat 13, starts the motor or engine and drives the sweeper 10 along the path to be swept. The operator controls the direction in which the sweeper moves by suitable manipulation of the steering wheel 14. The steering wheel 14 and associated mechanism controls the direction of the wheels such as 12. When the sweeper 10 is placed in operation, the cylindrical brush is rotatably driven to sweep up debris such as dirt and dust. Also, when the sweeper 10 is placed in operation, the vacuum pump is operated to draw a partial vacuum in the brush housing, on through the hopper and subsequently through the filter 17. The vacuum stream is then drawn through the ducts 41, 42, 43 and 44 to the vacuum pump. As a vacuum stream is drawn, of course, dust particles are stopped by the filter medium 19 and a layer of fine dust or dirt is accumulated on the lower surface of such filter medium 19. Once dust or dirt debris begins to collect on the filter medium 19, the striker 26 may be placed in operation by closing the electrical switch controlling current to motor 32. As the motor 32 rotatably drives the eccentric weight 37, the motor 32, the cross member 33 and the straps 27, 28 begin to move. As is illustrated in FIG. III, the eccentric weight may first move one end of cross member 33 upwardly, namely, the end carrying sleeve 33a, with the other end of cross member 33, namely, the end carrying sleeve 33b, remaining in contact with the filter 17. As the eccentric weight continues to rotate the end with sleeve 33a returns to engagement with filter 17 and the end with sleeve 33b moves upwardly. In some instances, the cross member 33 may remain parallel with the filter 17 while moving up and down. The cross member 33 moves the center portions 27c and 28c of straps 27 and 28 alternately in an upward direction, thus, alternately raising and lowering the ends of straps 27 and 28. FIG. IV illustrates the configuration of the movement of one of the straps namely 27.

It has been found that very efficient removal of dust and dirt particles is obtained using the striker shown in the present invention. It is to be recognized that various modifications may be made in the details of the embodiment illustrated in FIGS. I–IV and in FIG. V without departing from the broader scope of the present invention. For example, this filter may be used in any environment to remove dust. One may provide a single strap rather than a pair of straps if desired. Alternatively, additional straps may be added. Moreover, pressure sensing switching mechanism may be used to automatically place motor 32 in operation once a predetermined pressure drop occurs across the planar filter.

An Industrial Filter Unit

An alternate filter unit 210 according to the present invention is shown in FIGS. VI through IX. Filter unit 210 is suitable for use in any environment for removing dust from dust-laden air. The filter unit 210 may include a filter housing 216 in which is mounted a panel filter 217. The panel filter 217 has a frame 218 of light gauge metal, for example, of aluminum. The panel filter 217 may also include a pleated filter medium 219 which is secured in frame 218. The filter 217 may have a perforated sheet metal member 221 disposed over the pleated medium 219.

A striker member 226 may be positioned over the filter 217. The striker 226 includes at least one and preferably two or more straps such as 227 and 228. The straps 227 and 228 may be of identical construction. Therefore, only strap 227 will be described. Strap 227 may be secured to the filter housing 216 at one end such as by a hinged structure 229. The other end of strap 227 has a free end 227a with a rubber pad or hammer 227b mounted thereon. The rubber pad 227b is sufficiently hard to impart a shock to the filter 217 when the pad 227b strikes the filter frame 218. If desired, a resilient pad 220 may also be mounted at the filter 217 so that the striker pad 227b engages pad 220 which in turn imparts a shock to filter 217. Alternatively, a pad may be provided only at the filter and the strap would strike the pad to impart the shock. In this case the strap may be provided with a metal hammer.

The resilient pad or hammer 227b as shown in FIG. IX has a striker portion 227c of rubber and a screw-nut portion 227d for securement to strap 227.

The strap 228 may be secured in such a manner that it extends in an opposite direction from the direction strap 227 extends. In other words the secured end of strap 228 is adjacent the free end of strap 227 and the free end of strap 228 is adjacent the secured end of strap 227. The strap 228 has a hammer 228b at its free end which may be of construction identical to hammer 227b.

The striker 226 has an electrically operated motor 232 which is mounted on a cross member 233 by bolts 230. Cross member 233 may be secured to the intermediate portions of straps 227 and 228 such as by bolts 234 and 236. The cross member 233 has a hammer 233a and 233b mounted at opposite ends for striking the filter frame 218. The electrical motor 232 carries an eccentric weight 237.

The lower side of the filter 217 may communicate with an incoming dust-laden air stream from an inlet duct 231. The upper side of filter 217 communicates with a plurality of outlet ducts 241–244 which may lead through a blower chamber (not shown).

A cover 246 may be disposed over the filter 217 and striker 226. A cavity 247 is provided within cover 246 in which the striker member 226 is disposed. The spacing between the cover 246 and the filter 217 is sufficient to permit appropriate movement of the motor 232 with the eccentric weight 237 as well as movement of the striker straps 227 and 228 as illustrated by broken lines in FIGS. VI and VII.

Operation of the Industrial Filter

Although operation of filter 210 is apparant from the preceding description, it will be described hereinafter. An air stream is drawn or pushed through duct 231 and filter medium 219, depositing dust particles on the lower surface of filter medium 219. The cleaned air stream after passing through chamber 247 passes out through ducts 241–244. The electric motor 232 may be manually switched on when the pressure drop across filter 217 becomes significant. The motor 232 rotatably drives the eccentric weight 237 which in turn imparts a vertical component driving force to the cross member 233 and the straps 227 and 228. The cross member 233 through hammers 233a and 233b strikes filter frame 218 thus producing a shock to filter medium 219 knocking off dust accumulation. The straps 227 and 228 through hammers 227b and 228b similarly impart a shock to the filter 217. The striker member 226 may alternatively be activated by a pressure sensitive switching device which is turned on whenever the pressure drop across filter 217 exceeds a predetermined value. A restraint member 327 may be provided to limit the upward movement of straps 227 and 228. The restraint member 327 may have a rubber pad 327b to absorb shock and sound. The filter 210 may be used in any of various environments one of which is in a sweeper.

What is claimed:

1. A sweeper comprising a body structure, a plurality of wheels supporting said body structure, and a sweeper housing, said body structure including a hopper, a vacuum pump and a dust filter, said hopper serving to store debris picked up by said sweeper, said vacuum pump serving to draw a partial vacuum in said sweeper housing thereby providing a moving airstream, said dust filter being disposed in said airstream to remove dust particles from said airstream, said dust filter comprising a filter housing, a pleated planar filter medium, support means for said filter medium and a striker mechanism for removing accumulated dust from said filter medium, said striker mechanism including at least one strap, said strap having a first end secured with respect to said filter housing, said strap having a second end which is free to move with respect to said filter housing and filter medium, said second end carrying at least one hammer, said strap and hammer overlying the upper edges of the pleated filter medium, and an oscillator supported on said strap intermediate said first and second ends for imparting movement to said strap and hammer to impart shock to said filter medium thereby removing dust accumulation.

2. The sweeper of claim 1 wherein said oscillator comprises a rotatably driven eccentric weight means, said strap comprises at least one elongated metal strap extending substantially across said filter medium and wherein said hammer comprises a resilient pad secured to said strap.

3. The sweeper of claim 2 wherein said striker mechanism comprises two elongated metal straps each carrying a resilient pad.

4. The sweeper of claim 3 wherein said rotatably driven eccentric weight means comprise a motor and a single eccentric weight which drives both metal straps.

5. The sweeper of claim 2 wherein said second end of said metal strap is partially restrained in movement with respect to said filter support means.

6. A filter device comprising a planar porous filter and mechanical means for removing fine particulate material from said pleated planar porous filter, said mechanical means comprising elongated strap means overlying said porous filter to provide a shock to said filter and an oscillator acting on an intermediate portion of said strap means for driving said strap means to repeatedly shock said filter, thereby removing fine particles from said filter.

7. The filter device of claim 6 wherein said elongated strap means comprise a pair of straps and a cross member secured to said straps, said straps and said cross member each carrying resilient pads.

8. The filter device of claim 7 wherein one end of each of said straps is secured and wherein the other ends of each of said straps are at least partially free to move.

9. The filter device of claim 8 wherein said oscillator is an eccentric weight means.

10. The filter device of claim 9 wherein said straps are secured at opposite ends.

11. A sweeper comprising a body structure, a plurality of wheels supporting said body structure, and a sweeper housing, said body structure including a hopper, a vacuum pump and a dust filter, said hopper serving to store debris picked up by said sweeper, said vacuum pump serving to draw a partial vacuum in said sweeper housing thereby providing a moving airstream, said dust filter being disposed in said airstream to remove dust particles from said airstream, said dust filter comprising a filter housing, a pleated planar filter medium, support means for said filter medium and a striker mechanism for removing accumulated dust from said filter medium, said striker mechanism comprising at least two elongated metal straps each carrying a hammer comprising a resilient pad, said straps overlying the upper edges of the pleated filter medium, said elongated metal straps being secured to a cross member intermediate the ends of said straps, and an oscillator supported on said cross member for imparting movement to said straps and resilient pads to impart shock to said filter medium thereby removing dust accumulation.

* * * * *